(12) United States Patent
    Komiyama

(10) Patent No.: US 9,815,383 B2
(45) Date of Patent: Nov. 14, 2017

(54) CONTROLLER FOR SECONDARY BATTERY

(71) Applicant: TOYOTA JIDOSHA KABUSHIKI KAISHA, Toyota-shi, Aichi-ken (JP)

(72) Inventor: Keita Komiyama, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 106 days.

(21) Appl. No.: 15/061,183

(22) Filed: Mar. 4, 2016

(65) Prior Publication Data
    US 2016/0264017 A1    Sep. 15, 2016

(30) Foreign Application Priority Data
    Mar. 9, 2015   (JP) .................. 2015-046151

(51) Int. Cl.
    *H02J 7/00*      (2006.01)
    *B60L 11/18*     (2006.01)
    *H01M 10/44*     (2006.01)
    *H01M 10/48*     (2006.01)
    *H01M 10/42*     (2006.01)

(52) U.S. Cl.
    CPC ......... *B60L 11/1862* (2013.01); *H01M 10/44* (2013.01); *H01M 10/48* (2013.01); *H01M 10/486* (2013.01); *H01M 2010/4271* (2013.01)

(58) Field of Classification Search
    CPC ... B60L 11/1862; H01M 10/44; H01M 10/48; H01M 10/486; H01M 2010/4271
    See application file for complete search history.

(56) References Cited

U.S. PATENT DOCUMENTS

| 2014/0114514 A1* | 4/2014 | Crombez .............. B60W 10/06 701/22 |
| 2016/0011274 A1 | 1/2016 | Morita et al. |

FOREIGN PATENT DOCUMENTS

| JP | 2001-157369 A | 6/2001 |
| JP | 2010-251000 A | 11/2010 |
| JP | 2012-49017 A | 3/2012 |
| JP | 2013-74706 A | 4/2013 |
| JP | 2014-190763 A | 10/2014 |

* cited by examiner

*Primary Examiner* — Vuthe Siek
(74) *Attorney, Agent, or Firm* — Sughrue Mion, PLLC

(57) ABSTRACT

A controller is a controller for a secondary battery for which a lower limit SOC setting value and an upper limit SOC setting value are set in advance and that is used in a use potential width determined by the lower limit SOC setting value and the upper limit SOC setting value. This controller is configured to: compute a post-deterioration positive electrode use minimum potential that is shifted from an initial positive electrode use minimum potential to a high potential side due to the deterioration of the secondary battery; and reset the lower limit SOC setting value to a value that is lower than the lower limit SOC setting value set in advance and that is higher than the SOC 0% in accordance with a shift amount as a difference between the post-deterioration positive electrode use minimum potential and the initial positive electrode use minimum potential.

5 Claims, 4 Drawing Sheets

CONTROLLER FOR SECONDARY BATTERY

INCORPORATION BY REFERENCE

The disclosure of Japanese Patent Application No. 2015-046151 filed on Mar. 9, 2015 including the specification, drawings and abstract is incorporated herein by reference in its entirety.

BACKGROUND OF THE INVENTION

1. Field of the Invention

The invention relates to a controller for a secondary battery.

2. Description of Related Art

In recent years, importance of each of a lithium-ion secondary battery, a nickel hydrogen battery, and other types of secondary batteries has been increased as an in-vehicle power supply. In particular, the lithium-ion secondary battery that can obtain high energy density in light weight has preferably been used as an in-vehicle high output power supply for a plug-in hybrid vehicle (PHV), an electric vehicle (EV), or the like.

The secondary battery of this type has such tendencies that a capacity thereof is significantly reduced when the battery remains unused in a high state of charge (SOC) and that an output characteristic thereof is deteriorated when the SOC is reduced. Accordingly, a lower limit SOC setting value (for example, 20%) that is higher than the SOC 0% and an upper limit SOC setting value (for example, 80%) that is lower than the SOC 100% are set. Then, the battery is used within a use potential width that is determined by the lower limit SOC setting value and the upper limit SOC setting value. In this way, high performance of the secondary battery is achieved. Japanese Patent Application Publication No. 2013-74706 (JP 2013-74706 A) can be raised as the related art on setting of an SOC use range of this type. In this publication, a vehicular controller is disclosed that controls an upper limit value of a battery capacity such that the upper limit value falls within a range, by which progress of deterioration can be suppressed, during parking of a vehicle and such that the secondary battery can be used in a wide range of the battery capacity so as to sufficiently secure traveling performance of the vehicle during traveling of the vehicle.

By the way, it has been known that the secondary battery, such as the lithium-ion secondary battery, is typically deteriorated with use. Main causes of the deterioration are precipitation of a charge carrier (lithium in the case of the lithium-ion secondary battery) in a negative electrode, formation of a film in the negative electrode, and the like. In the art disclosed in JP 2013-74706 A, even when progress of the deterioration as described above can be suppressed to some extent, the reduction in the usable battery capacity (and thus an energy amount) is possibly significant once the deterioration is progressed.

SUMMARY OF THE INVENTION

The invention provides a controller for a secondary battery that can suppress reduction in battery capacity even after deterioration.

A controller suggested herein is a controller for a secondary battery for which a lower limit SOC setting value that is higher than an SOC 0% and an upper limit SOC setting value that is lower than the SOC 100% are set in advance and that is used in a certain use potential width determined by the lower limit SOC setting value and the upper limit SOC setting value. This controller includes: a memory section configured to store an initial positive electrode use minimum potential $V_0$ of a positive electrode provided in the secondary battery, the initial positive electrode use minimum potential $V_0$ corresponding to the lower limit SOC setting value set in advance; and a lower limit SOC setting value setting section for setting the lower limit SOC setting value of the secondary battery. The lower limit SOC setting value setting section is configured to compute a post-deterioration positive electrode use minimum potential $V_x$ that is shifted from the initial positive electrode use minimum potential $V_0$ to a high potential side due to the deterioration of the secondary battery. In addition, the lower limit SOC setting value setting section is configured to reset the lower limit SOC setting value to a value that is lower than the lower limit SOC setting value set in advance and is higher than the SOC 0% in accordance with a shift amount $(V_x - V_0)$ as a difference between the post-deterioration positive electrode use minimum potential $V_x$ and the initial positive electrode use minimum potential $V_0$. According to such a configuration, an SOC use region of the positive electrode can be secured even after the deterioration, and a reduction in battery capacity (and thus an energy amount) can be suppressed.

In one aspect of the controller disclosed herein, the lower limit SOC setting value setting section may be configured to compute a post-deterioration capacity maintenance value $(C_x/C_0)$ by dividing a post-deterioration capacity $C_x$ of the secondary battery by an initial capacity $C_0$ of the secondary battery and to compute the post-deterioration positive electrode use minimum potential $V_x$ on the basis of the post-deterioration capacity maintenance value $(C_x/C_0)$. With such a configuration, the post-deterioration positive electrode use minimum potential $V_x$ can accurately be computed.

In the one aspect of the controller disclosed herein, the lower limit SOC setting value setting section may be configured to compute the post-deterioration capacity $C_x$ on the basis of temperature—SOC history information that includes a battery temperature, the SOC, and an integrated time for which the secondary battery is held at each of the battery temperatures and in each of the SOCs of the secondary battery. With such a configuration, the post-deterioration capacity $C_x$ that is resulted from a deviation of the SOC in the negative electrode (precipitation of a change carrier or deactivation of the change carrier) can accurately be computed.

In the one aspect of the controller disclosed herein, a reduction width of the lower limit SOC setting value that corresponds to a value of the shift amount $(V_x - V_0)$ may be determined with reference to a map indicative of a relationship between the shift amount $(V_x - V_0)$ and the reduction width of the lower limit SOC setting value to be reduced.

In the one aspect of the controller disclosed herein, in a case where the value of the shift amount $(V_x - V_0)$ and a specified threshold are compared and the value of the shift amount $(V_x - V_0)$ is equal to or larger than the specified threshold, a reduction width of the lower limit SOC setting value that corresponds to a value of the shift amount $(V_x - V_0)$ may be determined with reference to a map indicative of a relationship between the shift amount $(V_x - V_0)$ and the reduction width of the lower limit SOC setting value to be reduced. In the case where the deviation of the SOC in the negative electrode is expanded to an impermissible degree, a lower limit SOC setting value setting process described above can be executed at appropriate timing.

Such a controller is preferred as a controller for a secondary battery that is mounted in a vehicle, such as an automobile. Thus, according to another aspect of the invention, a vehicle that includes any of the controllers disclosed herein is provided. In particular, because high output can be obtained in light weight, a vehicle (for example, an automobile) that includes a lithium-ion secondary battery as a power source (typically, a power source of a hybrid vehicle or an electric vehicle) is provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
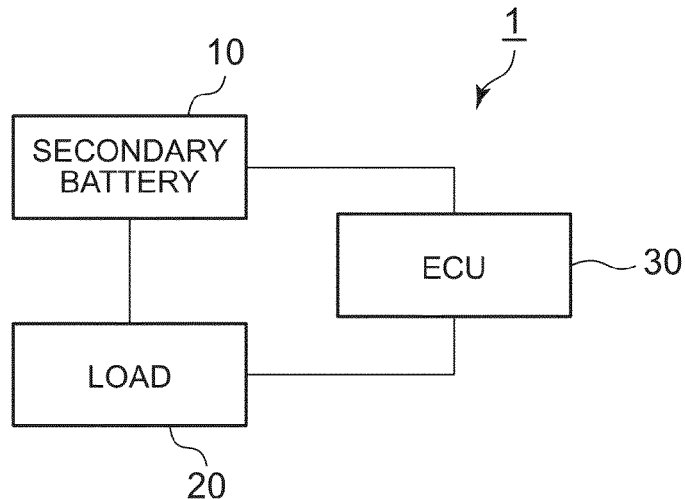
FIG. 1 is a block diagram of a configuration of a power supply system that is controlled by a controller for a secondary battery according to this embodiment.

A specific description will hereinafter be made on preferred embodiments of the invention. However, there is no intention of limiting the invention to such embodiments. It should be noted that matters that are other than matters mentioned particularly in this specification and that are required to implement the invention can be comprehended as design matters of a person skilled in the art based on the related art in the field. The invention can be implemented on the basis of the disclosed content of this specification and common general knowledge in the field. In addition, members and portions that exhibit the same actions are denoted by the same reference numerals in the drawings below, and overlapping descriptions may not be made.

A secondary battery as a control target of a controller disclosed herein is not particularly limited. For example, various types of the secondary batteries that can repeatedly be charged or discharged due to movement of an electric charge that is associated with movement of a charge carrier between positive and negative electrodes can be the target. For example, a lithium-ion secondary battery is a secondary battery that uses a lithium ion as the charge carrier, and can be one example of a preferred secondary battery as a target of the art. The invention will hereinafter be described in detail by mainly using a case where the invention is applied to the lithium-ion secondary battery that is mounted in a vehicle as an example although it is not particularly intended to limit the invention thereto.

First Embodiment

FIG. 1 is a block diagram of a configuration of a power supply system 1 that is controlled by a controller for a lithium-ion secondary battery 10 according to this embodiment. This controller for the lithium-ion secondary battery 10 is preferably used for a vehicle (typically, an automobile, particularly an automobile that includes an electric motor like a hybrid vehicle, an electric vehicle, or a fuel-cell vehicle).

The power supply system 1 can be configured by including the lithium-ion secondary battery 10, a load 20 connected thereto, and an electronic control unit (ECU) 30 that adjusts actuation of the load 20 in accordance with a state of the lithium-ion secondary battery 10. The load 20 that is connected to the lithium-ion secondary battery 10 can include an electric power consuming device (for example, a motor) that consumes electric power stored in the lithium-ion secondary battery 10. Said load 20 can include an electric power supply device (a charger) that supplies the electric power with which the battery 10 can be charged.

The lithium-ion secondary battery 10 is constructed of a positive electrode and a negative electrode that oppose each other as well as an electrolyte, which contains lithium ions, is supplied to these positive and negative electrodes. The positive electrode and the negative electrode each contain an active material that can store and discharge the lithium ions. During charge of the battery, the lithium ions are discharged from the positive electrode active material, and these lithium ions are stored in the negative electrode active material through the electrolyte. Contrary to this, during discharge of the battery, the lithium ions that are stored in the negative electrode active material are discharged, and these lithium ions are again stored in the positive electrode active material through the electrolyte. Due to movement of these lithium ions between the positive electrode active material and the negative electrode active material, electrons flow from the active material to an external terminal. In this way, the electric power is discharged to the load 20.

Figure 2:
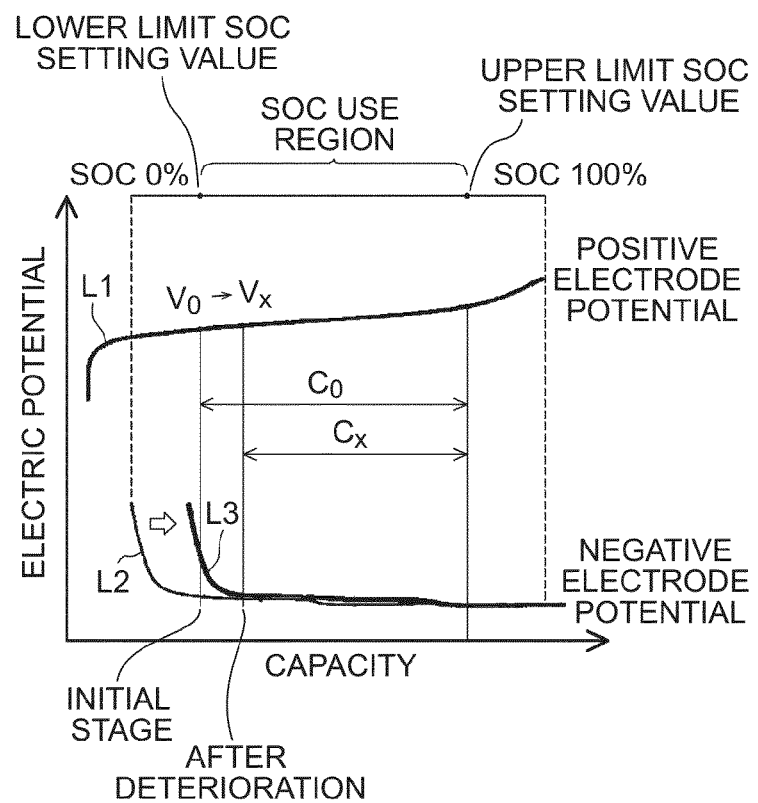
FIG. 2 is a chart that exemplifies open circuit potentials of a positive electrode and a negative electrode.

FIG. 2 is a chart that exemplifies open circuit potentials of the positive electrode and the negative electrode. As described above, the positive electrode and the negative electrode each include an active material layer that is formed of the active material. An electric potential in the active material for storing the lithium ions is determined by a crystal structure, a composition, and the like. A reversibly chargeable/dischargeable capacity as the battery (a reversible capacity) is determined by size of a region in which capacity use ranges of a positive electrode potential L1 and a negative electrode potential L2 overlap in the open circuit potentials of the positive electrode and the negative electrode. In the region where the capacity use ranges of the positive electrode potential L1 and the negative electrode potential L2 overlap, a state of charge in which a specified upper limit voltage can be obtained (that is, a full charge state) is set as an SOC 100%, and a state of charge in which a specified lower limit voltage can be obtained (that is, an uncharged state) is set as the SOC 0%. In addition, from a protective perspective of the secondary battery, a lower limit SOC setting value that is higher than the SOC 0% and an upper limit SOC setting value that is lower than the SOC 100% are set in advance before this control is executed. The secondary battery is used within a use potential width (an SOC use region) that is determined by said lower limit SOC setting value and upper limit SOC setting value.

Here, according to findings of the inventor, in the lithium-ion secondary battery, for example, the lithium ions as charge carriers are consumed by formation of a film in the negative electrode, the formation of the film is caused by the charge or discharge, and an irreversible capacity can be generated. In addition, the irreversible capacity is increased when the lithium ions are precipitated on a surface of the negative electrode and deactivated, or the like. When the irreversible capacity is increased just as described, even at a late stage of the discharge, a negative electrode potential L3 does not return to the initial negative electrode potential L2 (a deviation of the SOC in the negative electrode). Due to this, the positive electrode potential upon termination of the discharge (a positive electrode use minimum potential) is also shifted from an initial positive electrode potential $V_0$ to $V_x$ on a high potential side (even when the electric power is discharged to the lower limit SOC setting value, the positive electrode potential is reduced only to $V_x$ in appearance). That is, after above deterioration, the positive electrode use minimum potential is increased from $V_0$ to $V_x$, and the SOC use region (the use potential width) is reduced from that at an initial stage. Thus, when the battery is charged or discharged within a range that has the same lower limit SOC setting value, a battery capacity $C_x$ is reduced from an initial capacity $C_0$.

In the art disclosed herein, attention is focused on a shift amount of the positive electrode use minimum potential $V_x$ to the high potential side ($V_x-V_0$) that is associated with such a deviation of the SOC in the negative electrode, and the lower limit SOC setting value is reset to a value that is lower than the lower limit SOC setting value set in advance in accordance with this shift amount ($V_x-V_0$). In this way, the SOC use region is secured.

That is, in this power supply system 1, the ECU 30 computes the post-deterioration positive electrode use minimum potential $V_x$ that is shifted from the initial positive electrode use minimum potential $V_0$ to the high potential side, the post-deterioration positive electrode use minimum potential $V_x$ is shifted due to the deterioration of the lithium-ion secondary battery 10, and the ECU 30 resets the lower limit SOC setting value to a value that is lower than the lower limit SOC setting value (an initial value) set in advance and is higher than the SOC 0% in accordance with the shift amount ($V_x-V_0$) as a difference between the post-deterioration positive electrode use minimum potential $V_x$ and the initial positive electrode use minimum potential $V_0$. Then, the actuation of the load 20 is controlled such that the lithium-ion secondary battery 10 is charged or discharged with this lower limit SOC setting value, which is reset, as a lower limit. A typical configuration of the ECU 30 at least includes a read only memory (ROM) that stores a program used to execute such control, a central processing unit (CPU) that can execute the program, a random access memory (RAM) that temporarily stores data, and input/output ports, which are not shown. The ROM stores the initial value of the lower limit SOC setting value that is set in advance and the initial positive electrode use minimum potential $V_0$ that corresponds to said lower limit SOC setting value (the initial value). The controller of this embodiment is constructed of this ECU 30.

Figure 3:
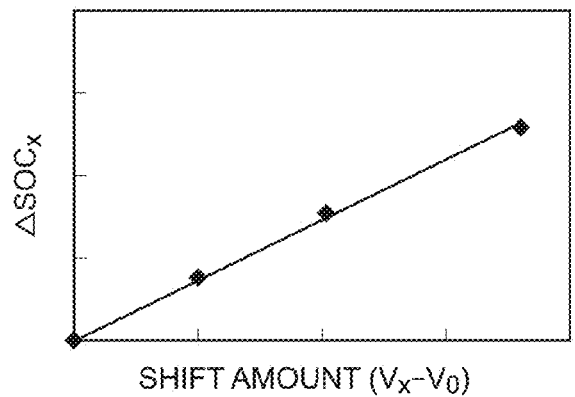
FIG. 3 is a chart that shows one example of data map for indicating a relationship between a shift amount of a positive electrode use minimum potential and a reduction width $\Delta SOC_x$.

As described above, the ECU 30 computes the post-deterioration positive electrode use minimum potential $V_x$ that is shifted from the initial positive electrode use minimum potential $V_0$ to the high potential side, the post-deterioration positive electrode use minimum potential $V_x$ is shifted due to the deterioration of the lithium-ion secondary battery 10, and the ECU 30 resets the lower limit SOC setting value to a value that is lower than the lower limit SOC setting value (the initial value) set in advance and is higher than the SOC 0% in accordance with the shift amount ($V_x-V_0$) as the difference between the post-deterioration positive electrode use minimum potential $V_x$ and the initial positive electrode use minimum potential $V_0$ (a lower limit SOC setting value setting section). Typically, the lower limit SOC setting value is preferably reset to a value such that the positive electrode use minimum potential that has been shifted to the high potential side returns from $V_x$ to $V_0$. In this embodiment, data that indicates a relationship between the shift amount ($V_x-V_0$) of the positive electrode use minimum potential and a reduction width $\Delta SOC_x$ of the lower limit SOC setting value to be reduced is stored in a map form in the ROM (a memory section). Then, with reference to this data, the reduction width $\Delta SOC_x$ that corresponds to the shift amount ($V_x-V_0$) of the positive electrode use minimum potential is determined. For example, one example of such data is shown in FIG. 3. As shown in FIG. 3, the data that indicates the relationship between the shift amount ($V_x-V_0$) and the reduction width $\Delta SOC_x$ of the lower limit SOC setting value is stored in the map form here, and the reduction width $\Delta SOC_x$ is determined from this map. Then, the lower limit SOC setting value is reduced from the initial value by the thus-determined reduction width $\Delta SOC_x$, and the lower limit SOC setting value is reset to a value.

When the post-deterioration positive electrode use minimum potential $V_x$ is computed, a post-deterioration capacity $C_x$ of the secondary battery is divided by the initial capacity $C_0$ of said secondary battery to obtain a post-deterioration capacity maintenance value ($C_x/C_0$). Then, the post-deterioration positive electrode use minimum potential $V_x$ is preferably computed on the basis of the post-deterioration capacity maintenance value ($C_x/C_0$). More specifically, as it is apparent from FIG. 2, there is a correlation between the post-deterioration capacity maintenance value ($C_x/C_0$) and the post-deterioration positive electrode use minimum potential $V_x$, and the post-deterioration positive electrode use minimum potential $V_x$ is gradually increased as the post-deterioration capacity maintenance value ($C_x/C_0$) is reduced. By using this correlation, the post-deterioration positive electrode use minimum potential $V_x$ is preferably computed from the post-deterioration capacity maintenance value ($C_x/C_0$). In this embodiment, data that indicates the above correlation is stored in a map form in the ROM, and with reference to this data, the post-deterioration positive electrode use minimum potential $V_x$ is computed from the post-deterioration capacity maintenance value ($C_x/C_0$).

Figure 4:
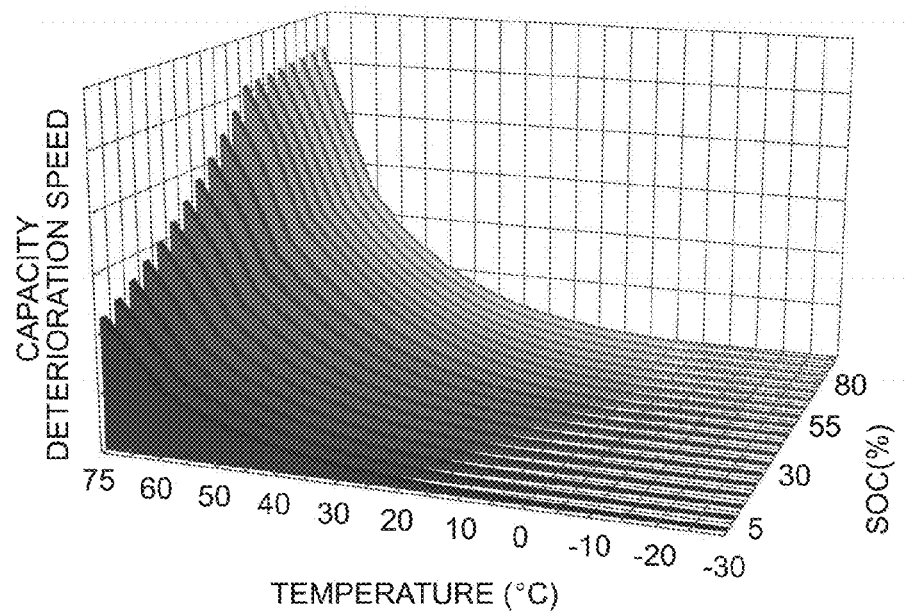
FIG. 4 is a graph that shows one example of a map for indicating a relationship among a battery temperature, an SOC, and a deterioration speed.

The post-deterioration capacity $C_x$ of the secondary battery 10 is preferably computed on the basis of temperature—SOC history information in which a battery temperature, the SOC, and an integrated time of the secondary battery, which is held at each of the battery temperatures and in each of the SOCs, are recorded. That is, the deviation of the SOC in the negative electrode is caused by the consumption of lithium by the formation of the film on the surface of the negative electrode and the deviation of the SOC in the negative electrode is caused by precipitation of lithium and deactivation, and the deviation of the SOC in the negative electrode is related to the deterioration, a deterioration speed is significantly changed by a temperature to which the secondary battery is exposed and the state of charge (SOC). More specifically, as shown in FIG. 4, the deterioration speed is increased as the battery temperature is increased and the SOC is high. By using this correlation, the post-deterioration capacity $C_x$ of the secondary battery that is resulted from the deviation of the SOC in the negative electrode can be comprehended from the temperature—SOC history information and the deterioration speed described above.

More specifically, the post-deterioration capacity $C_x$, is preferably computed from the above temperature—SOC history information and deterioration speed on the basis of an expression (1) below.

[Expression 1]

$$C_x = C_0 \times (1 - \Sigma(\alpha_x \times t_x)) \quad (1)$$

Here, in the expression, $C_x$: the post-deterioration capacity, $C_0$: the initial capacity, $\alpha_x$: a deterioration speed at each of the battery temperatures and in each of the SOCs, $t_x$: the integrated time for which the secondary battery is held at each of the battery temperatures and in each of the SOCs.

$C_0$ in the above expression (1) is the initial capacity of the secondary battery and is an given constant that is determined by the composition and an use amount of the active material. The initial capacity $C_0$ is preferably measured in advance by a preliminary experiment or the like. Alternatively, the initial capacity $C_0$ may be obtained by measuring the initial capacity of each battery upon shipment of battery cells. The measured initial capacity $C_0$ is preferably stored in the ROM. In addition, the deterioration speed $\alpha_x$ at each of the battery temperatures and in each of the SOCs is a coefficient that indicates a capacity deterioration amount per unit time of the secondary battery, and is a value that is determined on the basis of data indicative of a relationship among the battery temperature, the SOC, and the deterioration speed. In this embodiment, the data indicative of the relationship among the battery temperature, the SOC, and the deterioration speed is stored in a map form (see FIG. 4) in the ROM, and the deterioration speed $\alpha_x$ at a specified battery temperature (for example, a temperature range) and a specified SOC (for example, an SOC range) is determined with reference to this data. Such data can be obtained from a transition of the capacity deterioration amount at a time when the secondary battery that is adjusted to have the various different SOCs is subjected to an endurance test under various different temperature conditions.

The integrated time $t_x$ for which the secondary battery is held at each of the battery temperatures and in each of the SOCs can be obtained by integrating a time for which the secondary battery is held at the specified battery temperature (for example, the temperature range) and in the specified SOC (for example, the SOC range) for each of the specified battery temperatures and the specified SOCs. It should be noted that the SOC in the negative electrode can be deviated even when the battery is neither charged nor discharged (used). Thus, the above integrated time $t_x$, is preferably counted during use of the battery and also during suspension of the use of the battery. The obtained temperature—SOC history information is preferably stored in a form of a table or the like in the ROM.

The secondary battery 10 includes a voltage sensor (not shown) and a current sensor (not shown) that respectively detect a voltage and a current between terminals of the secondary battery as well as a temperature sensor (not shown) that detects the temperature of the secondary battery. The ECU 30 receives an output signal from each of the sensors via the input port. Then, on the basis of the output signal from each of the sensors, the ECU 30 obtains information on the battery temperature and the SOC of the secondary battery 10. For example, the ECU 30 can comprehend the SOC of the secondary battery from the voltage between the terminals that is detected by the voltage sensor. Alternatively, the ECU 30 may comprehend the SOC from an integrated value of the current that flows in and out of the secondary battery 10.

Figure 5:
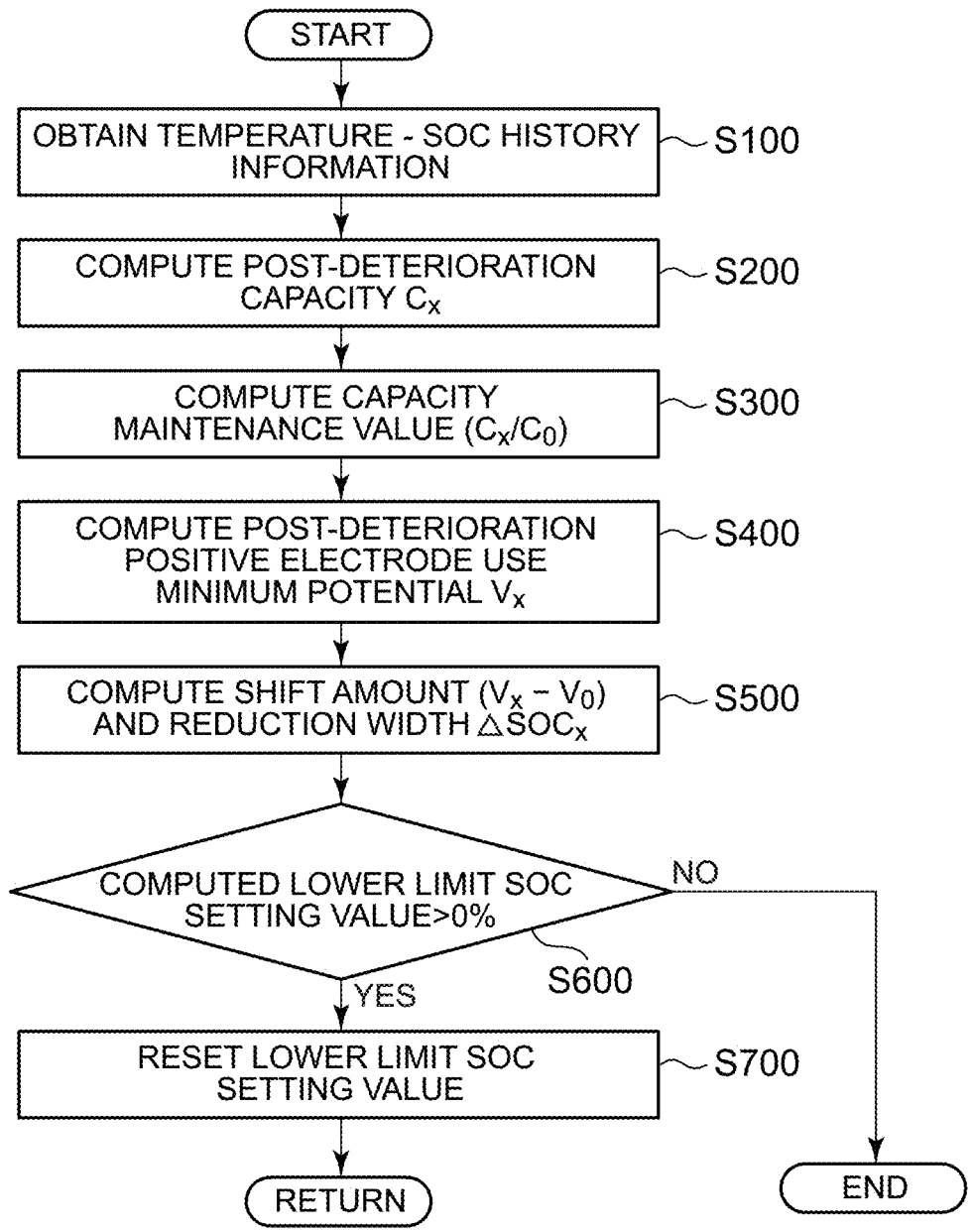
FIG. 5 is a flowchart of one example of a lower limit SOC setting value setting process routine that is executed by an ECU.

An operation of the thus-configured power supply system 1 will be described. FIG. 5 is a flowchart of one example of a lower limit SOC setting value setting process routine that is executed by the ECU 30 of the power supply system 1 according to this embodiment. This routine is periodically executed at every specified time (for example, every 10 hours to 1 month (for example, 24 hours to 1 week)) immediately after the power supply system 1 is mounted in the vehicle, for example.

When the lower limit SOC setting value setting process routine shown in FIG. 5 is executed, the CPU of the ECU 30 first obtains the temperature—SOC history information that includes the battery temperature, the SOC, and the integrated time for which the secondary battery is held at each of the battery temperatures and in each of the SOCs for the lithium-ion secondary battery 10 as a control target (step S100). Next, the post-deterioration capacity $C_x$ is computed on the basis of the expression (1) with reference to the data indicative of the relationship among the battery temperature, the SOC, and the deterioration speed (FIG. 4) that is stored in the ROM (step S200).

Then, the post-deterioration capacity maintenance value ($C_x/C_0$) is computed by dividing the above computed value of the post-deterioration capacity $C_x$ by the initial capacity $C_0$ that is stored in the ROM (step S300). The post-deterioration positive electrode use minimum potential $V_x$ that corresponds to the above computed value of the post-deterioration capacity maintenance value ($C_x/C_0$) is computed with reference to the data indicative of the relationship between the post-deterioration capacity maintenance value ($C_x/C_0$) and the post-deterioration positive electrode use minimum potential $V_x$ that is stored in the ROM (step S400). Next, the shift amount ($V_x - V_0$) of the positive electrode use minimum potential is computed by subtracting the initial positive electrode use minimum potential $V_0$ that is stored in the ROM from the above computed value of the post-deterioration positive electrode use minimum potential $V_x$, and the reduction width $\Delta SOC_x$ of the lower limit SOC setting value that corresponds to the above computed value of the shift amount ($V_x - V_0$) is determined with reference to the map (FIG. 3) indicative of the relationship between the shift amount ($V_x - V_0$) of the positive electrode use minimum potential that is stored in the ROM and the reduction width $\Delta SOC_x$ of the lower limit SOC setting value to be reduced (step S500).

Then, in step S600, the lower limit SOC setting value is computed by subtracting the above-determined reduction width $\Delta SOC_x$ from the initial value of the lower limit SOC setting value that is stored in the ROM, and it is determined whether this computed lower limit SOC setting value is equal to or smaller the SOC 0%. If the computed lower limit SOC setting value is equal to or smaller the SOC 0% (if No in step S600), this routine is completed without resetting the computed lower limit SOC setting value as a lower limit of the SOC use region. Then, at the time onward, the lower limit SOC setting value setting process routine is not executed. On the other hand, if the computed lower limit SOC setting value is higher than the SOC 0% (if Yes in step S600), the computed lower limit SOC setting value is reset as the lower limit of the SOC use region (step S700), and the current lower limit SOC setting value setting process routine is terminated. Then, at the time onward, the actuation of the load 20 is controlled with this lower limit SOC setting value that is reset as the lower limit of the SOC use region such that the lithium-ion secondary battery 10 is charged or discharged.

According to the above embodiment, the lower limit SOC setting value is reset to a value that is lower than the lower limit SOC setting value (the initial value) set in advance and is higher than the SOC 0% in accordance with the shift amount ($V_x - V_0$) as the difference between the post-deterioration positive electrode use minimum potential $V_x$ and the initial positive electrode use minimum potential $V_0$. Thus, the SOC use region can be secured even after the deterioration. That is, when the positive electrode use minimum potential is increased from $V_0$ to $V_x$ due to the deviation of the SOC in the negative electrode, the SOC use region (the use potential width) is reduced from that at the initial stage. For this reason, when the battery is charged or discharged within the range of the same lower limit SOC setting value, the battery capacity $C_x$ can exhibit a reduction tendency. However, according to the above embodiment, a reduction in the SOC use region can be suppressed by expanding the lower limit SOC setting value in accordance with the shift amount ($V_x - V_0$). Thus, even after the deterioration, a high energy amount can be maintained by suppressing a reduction in the battery capacity.

The description has been made so far on the lower limit SOC setting value setting process routine that is executed by the controller according to the one embodiment of the invention. Next, a lower limit SOC setting value setting process routine that can be executed by a controller according to another embodiment of the invention will be described.

Second Embodiment

In this embodiment, the ECU 30 is configured to: compute the post-deterioration positive electrode use minimum potential $V_x$ that is shifted from the initial positive electrode use minimum potential $V_0$ to the high potential side due to the deterioration of the secondary battery 10; and reset the lower limit SOC setting value to a value that is lower than the lower limit SOC setting value (the initial value) set in advance and higher than the SOC 0% in accordance with the shift amount ($V_x - V_0$) as the difference between the post-deterioration positive electrode use minimum potential $V_x$ and the initial positive electrode use minimum potential $V_0$ when the shift amount ($V_x - V_0$) is equal to or larger than a specified threshold X. That is, this embodiment differs from the above-described first embodiment in a point that the lower limit SOC setting value setting process routine is executed only in the case where the shift amount ($V_x - V_0$) of the positive electrode use minimum potential is increased and it is thus determined that the deterioration occurs to such a degree that the deviation of the SOC in the negative electrode cannot be permitted.

Figure 6:
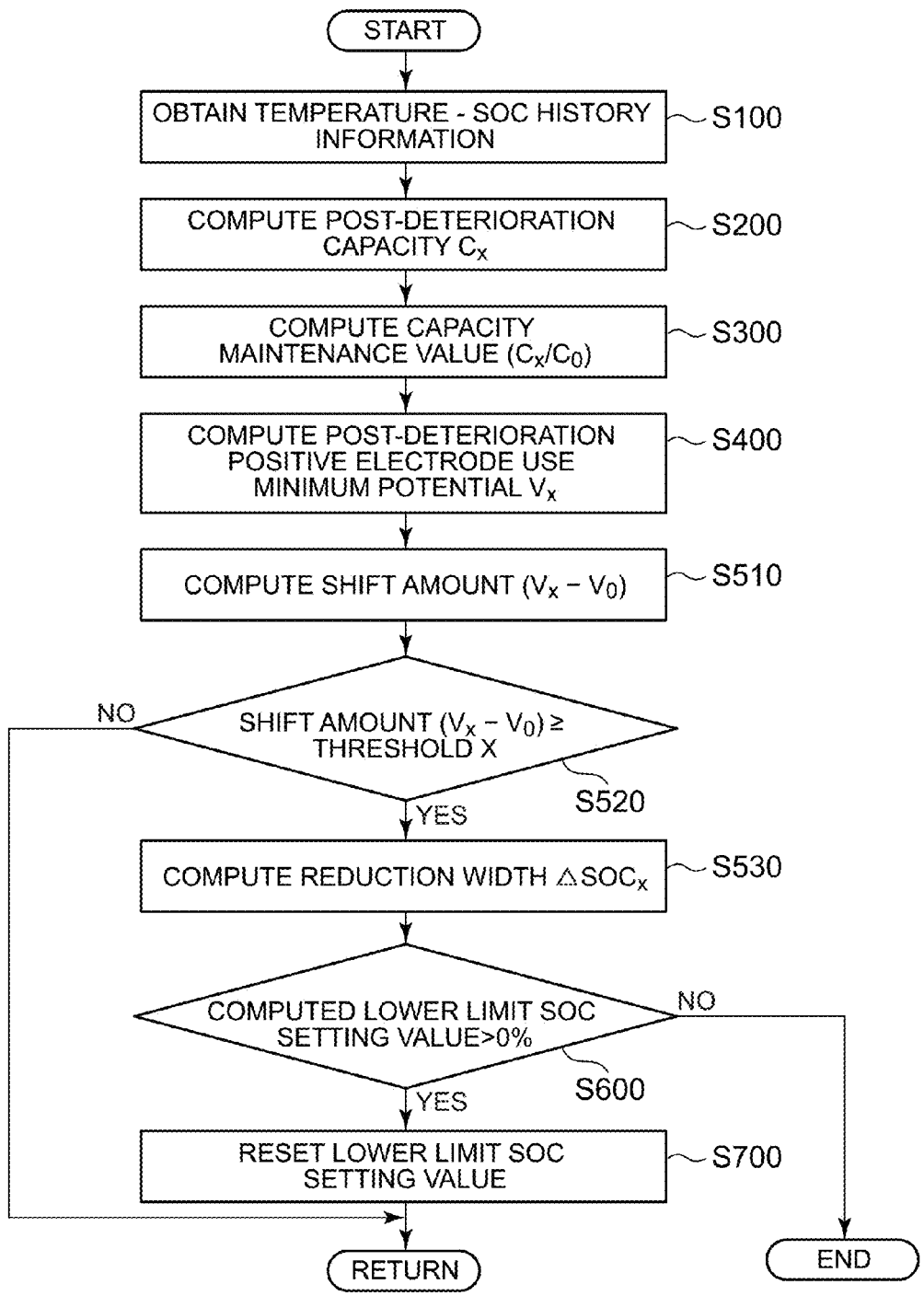
FIG. 6 is a flowchart of one example of the lower limit SOC setting value setting process routine that is executed by the ECU.

An operation of the thus-configured power supply system 1 will be described. FIG. 6 is a flowchart of one example of the lower limit SOC setting value setting process routine that is executed by the ECU 30 of the power supply system 1 according to this embodiment.

When the lower limit SOC setting value setting process routine shown in FIG. 6 is executed, the CPU of the ECU 30 first obtains the temperature—SOC history information that includes the battery temperature, the SOC, the integrated time for which the secondary battery is held at each of the battery temperatures and in each of the SOCs for the lithium-ion secondary battery 10 as the control target (step S100). Next, the post-deterioration capacity $C_x$ is computed on the basis of the expression (1) with reference to the data indicative of the relationship among the battery temperature, the SOC, and the deterioration speed (FIG. 4) that is stored in the ROM (step S200).

Then, the post-deterioration capacity maintenance value ($C_x/C_0$) is computed by dividing the above computed value of the post-deterioration capacity $C_x$ by the initial capacity $C_0$ that is stored in the ROM (step S300), and the post-deterioration positive electrode use minimum potential $V_x$ that corresponds to the above computed value of the post-deterioration capacity maintenance value ($C_x/C_0$) is computed with reference to the data indicative of the relationship between the post-deterioration capacity maintenance value ($C_x/C_0$) and the post-deterioration positive electrode use minimum potential $V_x$ that is stored in the ROM (step S400). Next, the shift amount ($V_x - V_0$) of the positive electrode use minimum potential is computed by subtracting the initial positive electrode use minimum potential $V_0$ that is stored in the ROM from the above computed value of the post-deterioration positive electrode use minimum potential $V_x$ (step S510).

Then, the computed value of the shift amount ($V_x - V_0$) and the threshold X that is stored in the ROM are compared (step S520). As a result, if the above computed value of the shift amount ($V_x - V_0$) is lower than the threshold X (if No in step S520), it is determined that the deviation of the SOC in the negative electrode is within a permissible range, and this routine is completed. On the other hand, if the above computed value of the shift amount ($V_x - V_0$) is equal to or larger than the threshold X (if Yes in step S520), it is determined that the deviation of the SOC in the negative electrode cannot be permitted, and the reduction width $\Delta SOC_x$ of the lower limit SOC setting value that corresponds to the above computed value of the shift amount ($V_x - V_0$) is determined with reference to the map (FIG. 3) indicative of the relationship between the shift amount ($V_x - V_0$) of the positive electrode use minimum potential that is stored in the ROM and the reduction width $\Delta SOC_x$ of the lower limit SOC setting value to be reduced (step S530).

Then, in step S600, the lower limit SOC setting value is computed by subtracting the above determined reduction width $\Delta SOC_x$ from the initial value of the lower limit SOC setting value that is stored in the ROM, and it is determined whether this computed lower limit SOC setting value is equal to or smaller the SOC 0%. If the computed lower limit SOC setting value is equal to or smaller the SOC 0% (if No in step S600), the computed lower limit SOC setting value is not set as the lower limit of the SOC use region, and this routine is completed. Then, at the time onward, the lower limit SOC setting value setting process routine is not executed. On the other hand, if the computed lower limit SOC setting value is higher than the SOC 0% (if Yes in step S600), the computed lower limit SOC setting value is set as the lower limit of the SOC use region (step S700), and the current lower limit SOC setting value setting process routine is terminated. Then, at the time onward, the actuation of the load 20 is controlled with this computed lower limit SOC setting value as the lower limit of the SOC use region such that the lithium-ion secondary battery 10 is charged or discharged.

According to the above embodiment, when the shift amount ($V_x - V_0$) of the positive electrode use minimum potential is equal to or larger than the specified threshold X, the computed lower limit SOC setting value that is lower than the lower limit SOC setting value (the initial value) set in advance is set in accordance with the shift amount ($V_x - V_0$). Thus, in the case where the deviation of the SOC in the negative electrode is expanded to an impermissible degree, the above-described lower limit SOC setting value setting process routine can be executed at appropriate timing.

In order to confirm an application effect of the invention, the following experiment was conducted.

A lithium-ion secondary battery configured that positive and negative electrode sheets, in which a positive electrode active material and a negative electrode active material are respectively held by a sheet-like positive electrode collector and a sheet-like negative electrode collector, are wound via a separator sheet and accommodated in a case together with an electrolyte was prepared. The initial battery capacity (the initial capacity $C_0$: see FIG. 2) was set as 100 when the lower limit SOC setting value of such a lithium-ion secondary battery was set to 27% and the upper limit SOC setting value thereof was set to 79%.

Example 1

The above lithium-ion secondary battery was accommodated in a high-temperature tank to conduct a high-temperature deterioration test. Then, the high-temperature deterioration test was continued until the post-deterioration battery capacity $C_x$ (see FIG. 2) in the case where the lower limit SOC setting value was set to 27% and the upper limit SOC setting value was set to 79% was reduced to 80% of the initial capacity $C_0$.

Example 2

The lower limit SOC setting value of the lithium-ion secondary battery after the above high-temperature deterioration test was reset to 15%. Then, the post-deterioration battery capacity in the case where the lower limit SOC setting value was set to 15% and the upper limit SOC setting value was set to 79% was measured. As a result, the post-deterioration battery capacity was approximately 96% of the initial capacity, and the battery capacity was recovered when compared to that in Example 1. From this result, it was confirmed that the reduction in the battery capacity could be suppressed by resetting the lower limit SOC setting value to a value that is lower than the lower limit SOC setting value (the initial value) set in advance after the deterioration.

The invention has been described so far in the preferred embodiments. However, these descriptions are not limitations, and, needless to say, various modifications can be made.

For example, in the above described embodiment, the case where the post-deterioration positive electrode use minimum potential $V_x$ is computed on the basis of the post-deterioration capacity maintenance value $(C_x/C_0)$ is exemplified. However, computation of the post-deterioration positive electrode use minimum potential $V_x$ is not limited thereto. For example, the post-deterioration positive electrode use minimum potential $V_x$ may directly be obtained by using the battery voltage or the like at a time when the battery is discharged to the lower limit SOC setting value. However, as in the above-described embodiment, in the case where the post-deterioration positive electrode use minimum potential $V_x$ is computed on the basis of the post-deterioration capacity maintenance value $(C_x/C_0)$, the post-deterioration positive electrode use minimum potential $V_x$ that is resulted from the deviation of the SOC in the negative electrode (the precipitation or the deactivation of the charge carrier) can further accurately be computed.

In addition, in the above-described embodiment, the case where the post-deterioration capacity $C_x$ is computed on the basis of the battery temperature, the SOC, and the temperature—SOC history information of the secondary battery is exemplified. However, computation of the post-deterioration capacity $C_x$ is not limited thereto. For example, the post-deterioration capacity $C_x$ may directly be measured from discharge capacity or the like at a time when a specified charging/discharging operation is performed for the battery. However, as in the above-described embodiment, in the case where the post-deterioration capacity $C_x$ is computed on the basis of the battery temperature, the SOC, and the temperature—SOC history information of the secondary battery, the post-deterioration capacity $C_x$ that is resulted from the deviation of the SOC in the negative electrode (the precipitation or the deactivation of the charge carrier) can further accurately be computed.

What is claimed is:

1. A controller for a secondary battery for which a lower limit SOC setting value that is higher than an SOC 0% and an upper limit SOC setting value that is lower than the SOC 100% are set in advance and that is used in a use potential width determined by the lower limit SOC setting value and the upper limit SOC setting value comprising:
   a memory section configured to store an initial positive electrode use minimum potential of a positive electrode provided in the secondary battery, the initial positive electrode use minimum potential corresponding to the lower limit SOC setting value set in advance; and
   a lower limit SOC setting value setting section configured to set the lower limit SOC setting value of the secondary battery, wherein
   the lower limit SOC setting value setting section computes a post-deterioration positive electrode use minimum potential that is shifted from the initial positive electrode use minimum potential to a high potential side due to the deterioration of the secondary battery, and resets the lower limit SOC setting value to a value that is lower than the lower limit SOC setting value set in advance and is higher than the SOC 0% in accordance with a shift amount as a difference between the post-deterioration positive electrode use minimum potential and the initial positive electrode use minimum potential.

2. The controller according to claim 1, wherein
   the lower limit SOC setting value setting section computes a post-deterioration capacity maintenance value by dividing the post-deterioration capacity of the secondary battery by an initial capacity of the secondary battery, and computes the post-deterioration positive electrode use minimum potential on the basis of the post-deterioration capacity maintenance value.

3. The controller according to claim 2, wherein
   the lower limit SOC setting value setting section computes the post-deterioration capacity on the basis of temperature—SOC history information that includes a battery temperature, the SOC, and an integrated time for which the secondary battery is held at each of the battery temperatures and in each of the SOCs of the secondary battery.

4. The controller according to claim 1, wherein
   a reduction width of the lower limit SOC setting value that corresponds to a value of the shift amount is determined with reference to a map indicative of a relationship between the shift amount and the reduction width of the lower limit SOC setting value to be reduced.

5. The controller according to claim 1, wherein
   in a case where the value of the shift amount and a specified threshold are compared and the value of the shift amount is equal to or larger than the specified threshold, a reduction width of the lower limit SOC setting value that corresponds to a value of the shift amount is determined with reference to a map indicative of a relationship between the shift amount and the reduction width of the lower limit SOC setting value to be reduced.

* * * * *